June 7, 1949. F. H. HAGNER 2,472,420
TOUCH SIGNAL LEVEL
Filed Nov. 28, 1944 3 Sheets-Sheet 1

Inventor
FREDERICK H. HAGNER
By Irving A. McCathran
Attorney

June 7, 1949.　　　F. H. HAGNER　　　2,472,420
TOUCH SIGNAL LEVEL
Filed Nov. 28, 1944　　　3 Sheets-Sheet 2
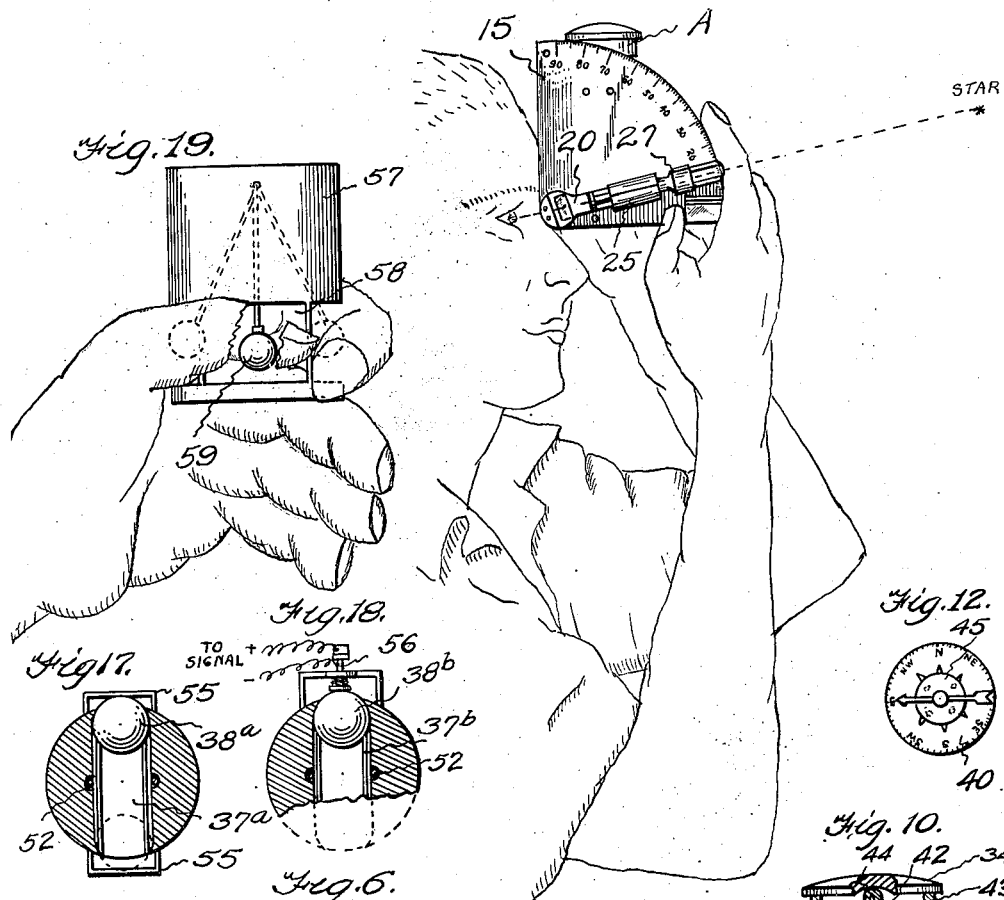
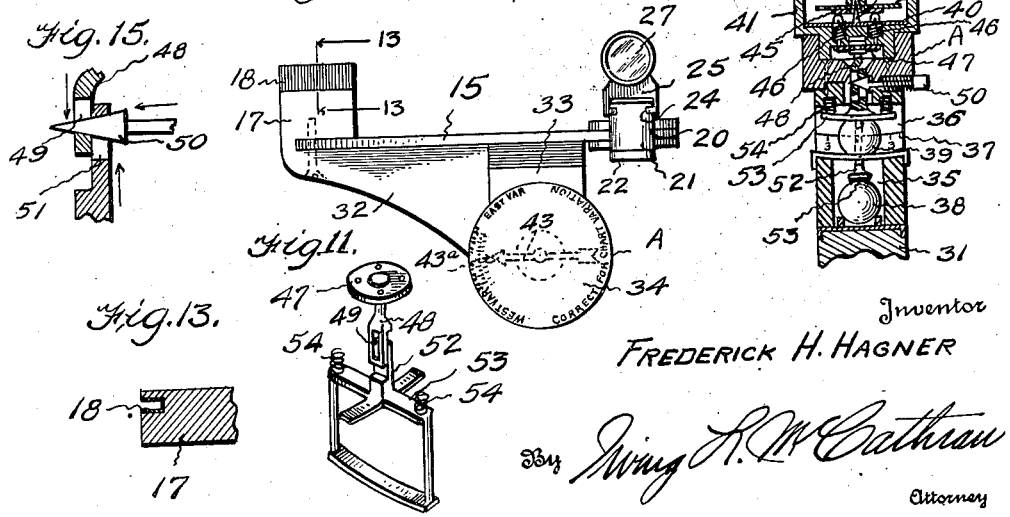
Inventor
FREDERICK H. HAGNER June 7, 1949. F. H. HAGNER 2,472,420
TOUCH SIGNAL LEVEL
Filed Nov. 28, 1944 3 Sheets-Sheet 3
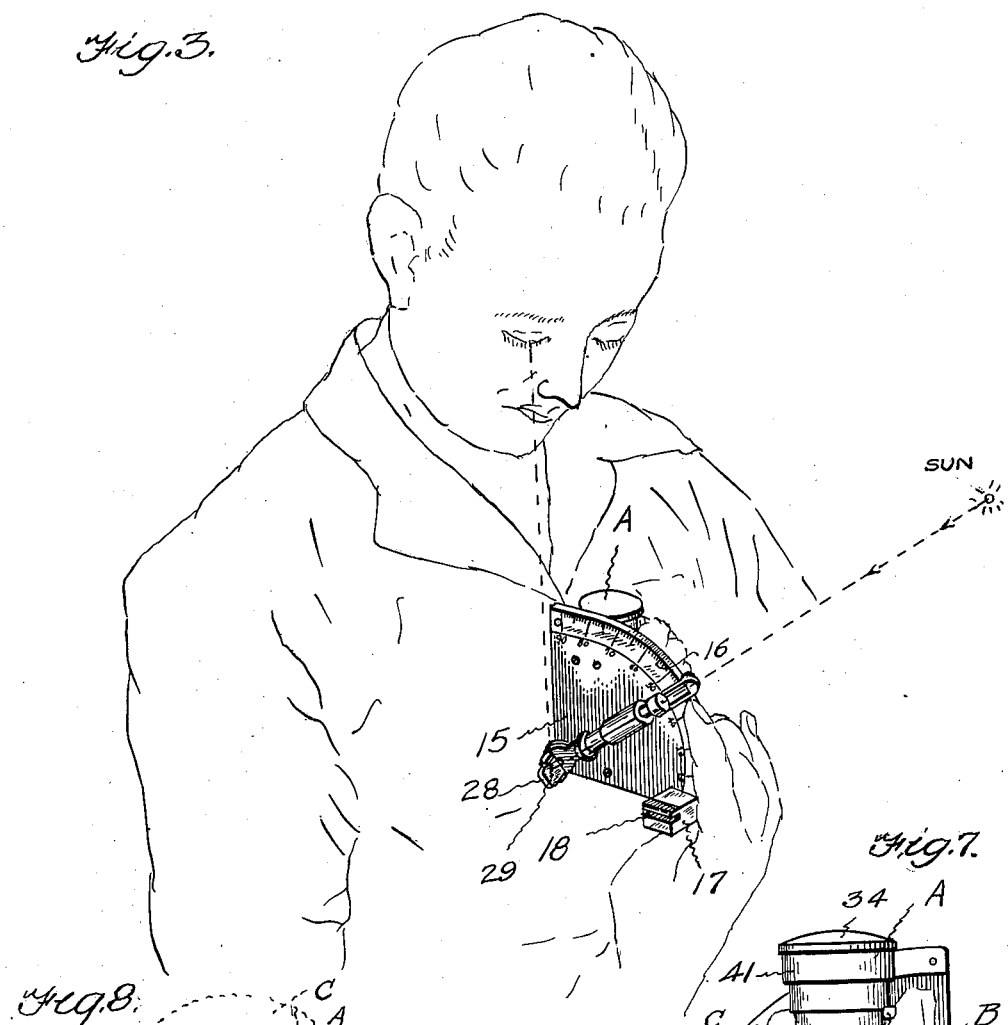
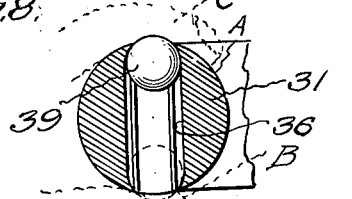
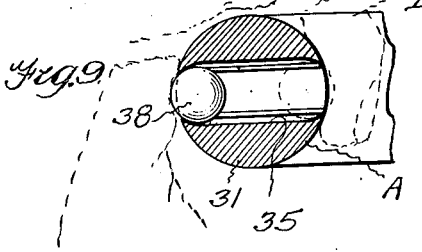
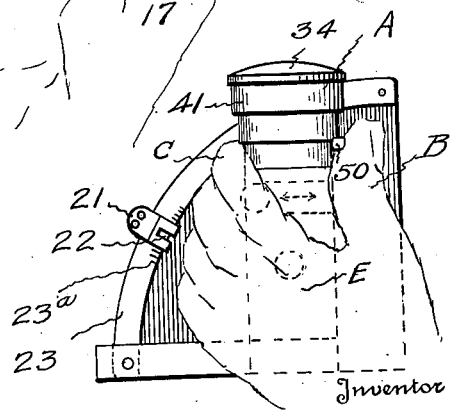
Inventor
FREDERICK H. HAGNER
By
Attorney Patented June 7, 1949

2,472,420

UNITED STATES PATENT OFFICE 2,472,420

TOUCH SIGNAL LEVEL

Frederick H. Hagner, San Antonio, Tex.

Application November 28, 1944, Serial No. 566,372

1 Claim. (Cl. 33—206)

This invention relates to an azimuth recording sextant and has for one of its objects the production of a simple and efficient instrument for measuring the altitude or depression angle of an object or celestial body relative to the position of an observer, and simultaneously recording its azimuth, and at the same time measuring the degree of tilt of the instrument in two directions at right angles to each other, one of which is in the direction of the body being observed.

This invention relates to a level-indicating device and has for one of its objects the production of a leveling device for determining true horizontal and vertical planes by the sense of instantaneous touch as caused by the contact of moving objects with the skin of the hand, fingers and the like, of the observer through the mental perception of a stimulus of the sensory nerves.

Other objects and advantages of this invention will appear throughout the following specification and claim.

In the drawings:

Figure 2 is a side elevational view of the instrument in use for measuring the angle of a star with respect to the eye of an observer and its azimuth;

Figure 3 is a perspective view of the instrument in use for observing a reflection of the sun, and using the leveling device to keep the instrument level by a sense of touch;

Figure 6 is a top plan view of the instrument;

Figure 7 is a side elevational view illustrating the manner in which the leveling device is gripped by the hand of an observer to provide sensitivity of touch when the leveling balls contact the hand;

Figure 8 is an enlarged horizontal sectional view taken on line 8—8 of Figure 5;

Figure 9 is an enlarged horizontal sectional view taken on line 9—9 of Figure 5;

Figure 10 is a fragmentary vertical sectional view taken on line 10—10 of Figure 5;

Figure 11 is a perspective view of the ball and compact locking mechanism;

Figure 12 is a top plan view of the compass which is carried in the top of the leveling device;

Figure 13 is a sectional view taken on line 13—13 of Figure 6;

Figure 15 is an enlarged sectional view illustrating the lock-releasing wedge and associated parts.

Figure 17 is a transverse sectional view through the leveling device illustrating a sound contact at the end of the ball race or channel;

Figure 18 is a transverse sectional view illustrating an electrical contact at the ends of the ball-contacting channels;

Figure 19 is a side elevational view of a modified form of the leveling device illustrating a suspended or pendulum indicating means.

Figure 4:
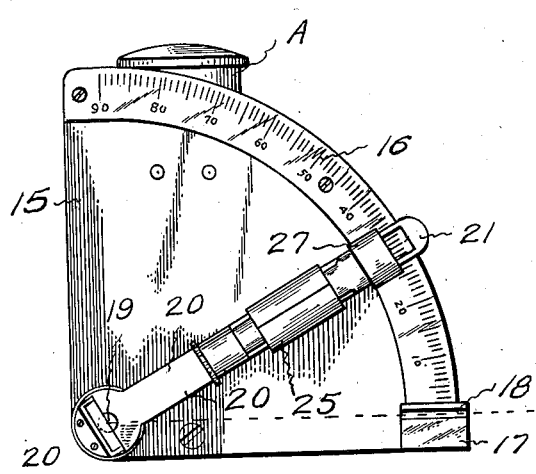
Figure 4 is a side elevational view of the instrument.
Figure 5:
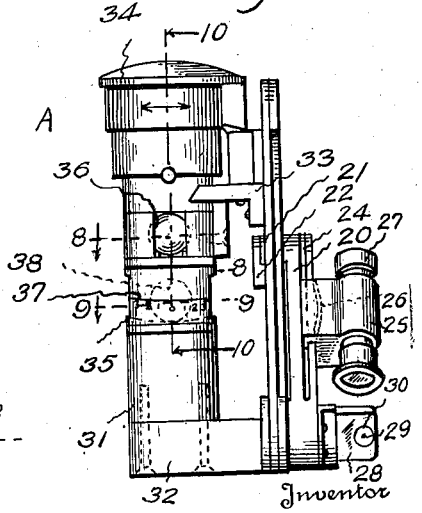
Figure 5 is a rear elevational view.

By referring to the drawings, it will be seen that 15 designates the quadrant of the instrument, which is provided adjacent its curved edge with a luminous scale 16. A horizon sighting reference block 17 is carried at the lower forward edge of the quadrant 15 at the bottom of the scale 16. This reference block 17 is provided with a longitudinal reference slot 18 which is in line with the bottom end of the scale 16 and in line with the pivot 19 of the angle-measuring arm 20. This pivot 19 is located at the lower rear corner of the quadrant 15, as shown in Figure 4.

The arm 20 is provided with an overhanging outer end 21 which straddles the outer curved edge of the quadrant 15, as shown, and a notched plate 22 is carried by the overhanging outer end 21. This plate 22 rides over a curved marking strip 23 upon the opposite side of the quadrant relative to the scale 16, so that the operator may mark the position of the notched plate 22 upon the marking strip 23 when taking a series of observations and may then calculate a mean angle of the arm 20 and the observed object. The arm 20 is longitudinally slotted on each side, as at 24, to receive the inwardly turned ribs of telescope-supporting sleeve 25. The slots 24 preferably extend to the outer end of the arm 20 so that the sleeve 25 may be reversed to observe an angle of depression. A suitable friction flat spring 26 may be carried by the sleeve to contact the arm 20 and hold the sleeve 25 in an adjusted position upon the arm 20. A telescope 27 is carried by the sleeve 25 and extends longitudinally of the arm 20, as shown. The arm 20 may be swung to the desired degree of arc on the quadrant 15 to obtain a proper observance of an object to measure the angle. A hinged index-reading glass 28 is carried by the inner end of the arm 20 and may be selectively swung into and out of alignment with the telescope. The glass 28 is provided with a reference point or aperture 29 for alignment with the center sight of the telescope 27 and this reference point 29 is preferably surrounded by a reference circle 30 which may be etched in the glass 28.

A leveling device A is carried by the quadrant 15 upon the opposite side relative to the arm 20 and extends in a vertical position in spaced relation to the quadrant plate 15. This leveling device comprises a tube 31 which is supported at its lower end by a base 32, which base is anchored at the lower end of the quadrant 15. The tube 31 is braced near its upper end by an anchoring brace 33, and a cap plate 34 which cap plate overhangs the upper end of the tube 31. The tube 31 is provided with a ball-receiving channel 35 which extends in a horizontal plane transversely of the quadrant 15. A second ball-receiving channel 36 is located in the tube 31 above the channel 35 at right-angles to the channel 35 and in a plane parallel to the quadrant 15. The tube 31, and the cap plate 34 are formed of transparent material and the inner faces of both channels 35 and 36 are graduated with a scale 37 preferably from zero at the center to 3 or 4 degrees toward each end. A ball 38 is freely mounted in the channel 35 and a ball 39 is similarly mounted in the channel 36. The ends of the channels 35 and 36 are restricted as to size as shown in Figures 8 and 9, to permit the balls to protrude slightly beyond the tube 31 when reaching the ends of the channels and at the same time be prevented from falling from the channels.

As shown in Figures 7, 8 and 9, when the tube 31 is gripped by the hand of an operator, the thumb B overlies one end of the channel 36, the tip of forefinger C overlies the opposite end of the channel 36, the tip of middle finger D overlies the inner end of the channel 35 and the hand adjacent its junction with the middle finger overlies the opposite end of the channel 35. Consequently, when the tube 31 tilts forwardly the ball 39 will contact the finger C, and if reversed the ball 39 will contact the thumb B. If tilted toward the right the ball 38 will contact the middle finger D, and if tilted toward the left the ball 39 will roll to the opposite end of the channel 35 and contact the palm of the hand E adjacent its junction with the middle finger. By means of this device an operator may determine whether or not the instrument is in a proper vertical position through the sense of touch and by moving the instrument so that all balls will be out of contact with his hand he will know that the instrument is approximately level. The balls may then be locked in their positions when proper reading or observation is taken and the positions of the ball 38 and 39 may be noted relative to the respective scales 37 and proper calculations may be made to allow for the position of the ball or balls in variance with the zero mark on the scale or scales 37. The locking device will be described in the following:

A compass dial plate 40 is carried in the rotating cap member 41 and is fixed therein. The cap member 41 however, rotates upon the upper end of tube 31 and is retained under the fixed cap plate 34. A vertical fixed pivot point 42 is carried at the center of the dial plate 40 and a magnetized compass needle 43 is loosely journaled upon the point 42, which point 42 extends upwardly and well into the knob 44 which knob is carried by the needle 43. A clamping plate 45 loosely surrounds the point 42 and is supported upon the heads of the spring-pressed pins 46. These pins 46 are attached at their inner ends to the supporting plate 47 to which is loosely connected the depending operating pin 48. This pin 48 is slotted, as at 49, to receive the double wedge or tapering end of the spring-pressed plunger 50. The tapering end of the plunger 50 also extends through the slotted end 51 of the upwardly extending pin of the ball-locking mechanism 52. Ball-contacting shoes 53 are carried by the locking mechanism and overhang the balls 38 and 39, and springs 54 normally urge the locking mechanism to a locking position.

As the plunger 50 is pressed inwardly, the wedge of the plunger will pass through the slotted ends 49 and 51 drawing the pin 48 downwardly and lifting the ball-locking device upwardly to release the ball-locking mechanism. The plate 45 will drop away from the needle 43 and the knob 44 will drop down to a journaled position upon the pin 42 out of contact with the under face of the cap plate 34 and then be free to register due north. When the plunger 50 is released the plate 45 is forced upwardly by the spring-pressed pins 46 which plate 45 engages the under face of the needle 43 and forces the knob 44 firmly against the under face of the cap plate 34, in this way locking the needle in a set position. At the same time the springs 54 will force the locking mechanism 52 to a ball-locking position. The position of the needle may then be read in its locked position and the position of the balls in their respective channels may be read upon the scales 37.

Figure 1:
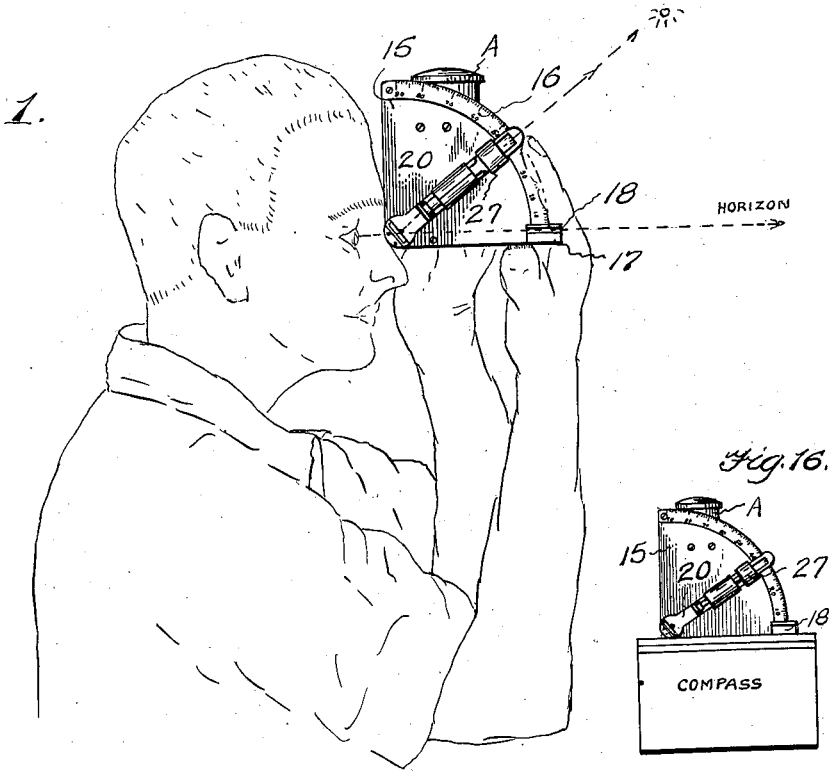
Figure 1 is a side elevational view of the instrument in use for observing the sun and the horizon.

It should be noted that the reference slot 18 of the reference block 17 is preferably provided with a black coating upon the inner faces or walls (see Figure 13) to facilitate the sighting of the horizon therethrough, in the manner as shown in Figure 1. The reference block 17 and the leveling device A are preferably constructed of transparent material.

It should be understood that many types of ball-contacting means may be provided at the ends of the ball-receiving channels of the leveling device. Two modified forms are illustrated in Figures 17 and 18.

In Figure 17 a sound contact plate 55 is shown. A plate 55 is supported at each end of the ball-receiving channel 37$^a$ so that when the ball 38$^a$ reaches the end of the channel 37$^a$ the striking of the ball with the plate 55 will produce a sound, thereby indicating to the observer the position of the ball.

In Figure 18 there is shown a modified form wherein an electrical contact 56 is located at the end of the channel 37$^b$. A suitable contact is placed at each end of each channel. The contact 56 is connected to a suitable signal which may be located in any desired position to notify the operator that the ball 38$^b$ has reached the end of the channel.

In Figure 19 it will be seen that a casing 57 is provided having openings 58 near the bottom thereof, and a pendulum ball 59 is hung within the casing 57. The fingers and hand of an operator are adapted to surround the openings 58 so as to provide a feeling contact with the ball 59 as the ball swings into engagement with the hand or fingers when the casing 57 is tilted thereby advising the operator by the sense of touch to move the leveling device to a proper position to bring the ball 59 out of contact with the hand or fingers and into approximate zenith position.

In actual operation when it is desired to measure the angle, for instance the sun, with respect to the horizon, the instrument is held in the position as shown in Figure 1, and the arm 20 is contacted at its outer end by the fingers of the operator and the arm is swung to a position where a reflection of a ray of light from the sun passing through the telescope 27 onto the reference point 29 of the glass plate 28 is brought into alignment with the eye of the observer and the slot 18 of the block 17 and the horizon. The observer maintains the instrument at its zenith point and determines whether or not the instrument is approximately perpendicular by means of the position of the ball in the lower channel which extends at right angles to the horizon. While this is being accomplished the needle 43 is free to swing to find its magnetic north. The thumb B, as shown in Figure 7, is then released from the push button or plunger 50 and the needle 43, as well as the balls 38 and 39, are instantaneously locked. The observer may then take the reading as indicated on the scale 16 which is the altitude or zenith distance of the body. Then he may take the reading of the position of the needle 43 in reference to the arrow 43ª on the cap plate 34, which will give the observer the azimuth of the body being observed from magnetic north. A correction may then be made to determine the true north. The observer may then read the position of the ball 38 with respect to the large arc 37 by determining the position of the equator of the ball with respect to the markings on the scale 37 to indicate the degree of correction with respect to the zenith or the lateral tilt of the leveling device.

If desired, a series of observations may be made and the position of the arm 20 at each time of observation may be marked upon the strip 23 as at 23ª—see Figure 7—and an average taken by placing the center notch 22 over the center point intermediate the extreme positions of the marks.

When it is desired to directly observe a star or other object, the instrument is held in the position shown in Figure 2, and a direct observation is made through the telescope 27. It is necessary, however, for the operator to grip the leveling device A in the manner as shown in Figure 7, and also in detail in Figures 8 and 9, whereby the fingers and hand surround the leveling device A and span the ends of the channels 35 and 36 so that he may feel the contact of the balls when the leveling device is tilted in any one of four directions. The instrument is then adjusted so that the balls will be out of contact with the hand or fingers and the observer then knows that the instrument is approximately at zenith. His thumb B is in the position shown in Figure 7 in contact with the spring pressed plunger 50 so as to depress this plunger and permit the magnetic needle to be free to move and permit the balls to be free to roll. When the object is sighted, the plunger 50 is immediately released, thereby locking the needle and the balls in the position at the instant of observation. A proper reading of the scale 16 may then be taken, a proper reading of the positions of the balls 38 and 39 in their respective channels may be taken, and a proper reading of the position of the magnetic needle may be taken and with these calculations a correct azimuth or zenith distance may be accurately obtained as well as the azimuth bearing of the body being observed with reference to magnetic north. Then proper corrections may be made as may be required.

When it is desired to observe an object, for instance the sun, by means of casting a ray of light upon the glass 28 and its reference point 29, the instrument is held in the position shown in Figure 3, it being braced by the right hand and the leveling device A being gripped by the left hand and the instrument being forced against the body. The fingers of the right hand are extended along the periphery of the arc or quadrant 15 in contact with the outer end of the arm 20 for slow motion and the arm is then adjusted or moved until a ray of light from the sun passes through the telescope and is cast upon the reference point 29 in the form of a circle of light which the observer can observe, and which circle of light will be in line with the observer's eye. In this way the observer has provided a means for determining when the ray of light is cast upon the reference point in the manner shown in Figure 3. At the same time, the leveling device is gripped by the hand of the operator in the manner described in the foregoing with respect to Figure 2. At the proper time of observation, the plunger 50 is released and the leveling balls and the magnetic needle are locked for proper inspection.

Figure 16:
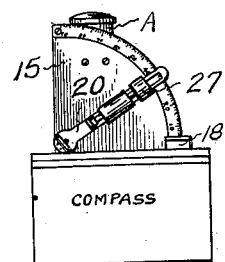
Figure 16 is a side elevational view of the instrument mounted upon a conventional compass.

As shown in Figure 16, the instrument may be placed upon the top of a compass and the arm 20 may be swung to the necessary angle and the operator may proceed in the same manner as that described with respect to Figure 3, and this offers a means for checking the compass upon which it is resting.

Figure 14:
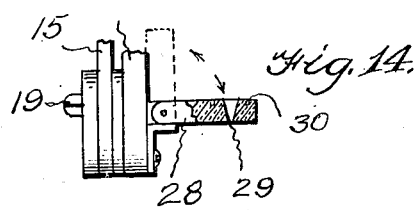
Figure 14 is a fragmentary rear elevational view of the instrument illustrating the lower end of the angle-measuring arm and the index reference glass, the glass being partly shown in section.

It should be understood that when the device is used in the manner shown in Figure 2, the glass plate 28 is swung flat against the arm and out of alignment with the telescope 27 or to the position shown in dotted lines in Figure 14. This glass plate 28 is frosted on the upper face thereof to facilitate seeing the light spot upon the surface thereof. Furthermore, it should be understood that all marks, scales and the like, are luminous, so that they may be read in the dark without artificial light. It should be further understood that each of the channels 35 and 36 is formed on the arc of a circle of considerable magnitude and for this reason it is only necessary to mark a few degrees within the length of the channel to provide accuracy.

While I have shown my leveling device as applied to a quadrant it will be understood that this leveling device may be used separately or in conjuncture with other apparatus without departing from the spirit of the invention.

The leveling device may be provided with any desired number of ball-receiving channels which may be arranged at various selected angles and should not be restricted to the use of two channels as illustrated.

Having described the invention, what I claim as new is:

A touch signal levelling device for use when visibility is impossible comprising a body having a transverse elongated channel, a freely rollable gravity-controlled ball rollable throughout the length of the channel, said body having restricted openings at the opposite ends of said channel of less diameter, than the diameter of the ball through which said ball is adapted to protrude when the body is tilted, the restricted openings preventing the displacement of the ball from the body, said openings being adapted to be covered by the hand of an operator, and said ball being adapted to signal the operator by sense of touch upon contact with the hand thereby signalling the operator that the levelling device deviates from the zenith point.

FREDERICK H. HAGNER.

REFERENCES CITED

The following references are of record in the file of this patent:

UNITED STATES PATENTS

| Number | Name | Date |
|---|---|---|
| 216,759 | Randolph | June 24, 1897 |
| 466,380 | Spencer | Jan. 5, 1892 |
| 715,823 | Lietz | Dec. 16, 1902 |
| 814,292 | Hutchins | Mar. 6, 1906 |
| 845,875 | Lewis | Mar. 5, 1907 |
| 963,242 | Osterberg | July 5, 1910 |
| 1,010,339 | Angel | Nov. 28, 1911 |
| 1,328,370 | Dutton | Jan. 20, 1920 |
| 1,399,994 | Phoenix | Dec. 13, 1921 |
| 1,665,058 | Hanna | Apr. 3, 1928 |
| 1,782,474 | McLaughlin | Nov. 25, 1930 |
| 1,944,897 | Macneil | Jan. 30, 1934 |
| 1,955,746 | Inglis | Apr. 24, 1934 |
| 2,068,017 | Given | Jan. 19, 1937 |
| 2,105,147 | Inglis | Jan. 11, 1938 |
| 2,330,603 | McNally | Sept. 28, 1943 |

FOREIGN PATENTS

| Number | Country | Date |
|---|---|---|
| 199,430 | Germany | 1907 |
| 47,938 | Australia | May 26, 1911 |
| 148,635 | England | July 29, 1920 |
| 433,636 | England | 1935 |